United States Patent [19]

Merchant

[11] Patent Number: 4,935,630
[45] Date of Patent: Jun. 19, 1990

[54] LENS-SPHERE OPTICAL SENSING SYSTEM
[75] Inventor: John Merchant, Needham, Mass.
[73] Assignee: Honeywell Inc., Minneapolis, Minn.
[21] Appl. No.: 315,278
[22] Filed: Feb. 24, 1989
[51] Int. Cl.$^5$ .............................................. G01J 1/06
[52] U.S. Cl. .................................. 250/353; 250/216; 250/349; 350/416; 350/448
[58] Field of Search ....................... 250/216, 353, 349; 350/416, 441, 448

[56] References Cited
U.S. PATENT DOCUMENTS

| | | | |
|---|---|---|---|
| 3,514,186 | 5/1970 | Poncelet | 350/441 |
| 4,184,749 | 1/1980 | Grossman | 250/216 |
| 4,422,733 | 12/1983 | Kikuchi et al. | 350/416 |
| 4,851,664 | 7/1989 | Rieger | 250/216 |

*Primary Examiner*—Carolyn E. Fields
*Attorney, Agent, or Firm*—Haugen & Nikolai

[57] ABSTRACT

A lens-sphere optical system for use in a low resolution, very wide angle optical sensor system for viewing incident energy from a scene of interest. A lens-sphere forms an output image of the scene of interest on a spherical surface. Apparatus for optically filtering the lens-sphere blocks incident energy outside of a predetermined range of incident angles. Apparatus for detecting the optically filtered output image is provided.

24 Claims, 4 Drawing Sheets

BLUR vs % ENERGY FOCUSSED

DIAMETER OF BLUR CIRCLE (DIGREES)

% OF TOTAL APERTURE ENERGY FOCUSED INTO BLUR CIRCLE

BLUR vs ANGLE(θ)

REFRACTION

MINIMUM BLUR

LENS-SPHERE OPTICAL SENSING SYSTEM

BACKGROUND OF THE INVENTION

This invention relates generally to optical sensing systems and, more particularly, to a low resolution, very wide angle optical sensing system having a lens in the form of a sphere for use in a missile warning system (MWS). This concept may be used for systems operating in the ultraviolet, visible light, or infrared wavelengths. As in any optical system, the material used to make the lens is selected to be transmitting over the operating spectral region of the system. Materials suitable for making ultraviolet, visible light, or infrared lenses are well known to those skilled in the art.

Prior art devices using a sphere as a lens have been generally thought to have resolution too low to be useful for target recognition systems. The invention, for the first time, utilizes and enhances the properties of such a system and overcomes previous deficiencies in the prior art to make a lens-sphere system which can be successfully used to recognize certain targets.

The effective entrance aperture of a lens-sphere optical system is the diameter of the sphere. However, as shown in FIG. 2, incident rays over this full aperture are not all brought to a common focus. In general, radially symmetric systems have nonvarying imaging quality over a wide field-of-view (FOV), but suffer from a relatively large "blur circle" which may be a handicap in a tactical environment.

Ray tracing analysis shows that, in known systems, the diameter of the blur circle at best focus, in the case when all of the incident rays are considered, is about 20 degrees. If a best position is found for only the central rays ($\theta = 0-50$ degrees, where $\theta$ is the angle of incidence at the sphere as illustrated in FIG. 2), then the blur circle diameter is only about 2.9 degrees, which would be considered excellent resolution for certain target recognition systems such as an MWS. However, at this particular focus position for the central rays, the peripheral rays ($\theta = 50$ to 90 degrees) are spread out over a blur circle diameter of about 58 degrees. Although 60% of the incident energy is contained in the well-focussed central beam, an appreciable fraction (about 40%) of the energy is in the badly defocussed peripheral beam.

The present invention recognizes that if the peripheral rays could be cut out—for example with an aperture stop—then only the relatively well-focussed central rays would be left. However, placing a physical stop in the system destroys the spherical symmetry of the system and defeats the design feature that allows the lens-sphere system to provide uniform performance over a very wide angular range.

To a certain extent, the peripheral rays are naturally obstructed because the transmission, from air into the sphere, decreases with increasing angle of incidence. See Table 1. This beneficial factor was not considered in calculating the percentage of energy in the badly defocused peripheral beam. The extreme peripheral rays which are the most severely defocussed are, very conveniently, the rays most strongly attenuated by this factor.

Additionally, in accordance with one embodiment of the invention, those parts of the surface of the sphere that accept incident rays may be coated with an interference filter specifically designed to attenuate transmission at incident angles over a range such as 60 to 80 degrees. Materials for forming multilayer interference filters are well known. The particular choice of material depends upon the wavelength of intended application and other factors typically considered in such designs. FIG. 3 shows the transmission of a typical angle-dependent filter versus wavelength for on-axis rays and for rays 50° off-axis. This provides additional blocking of those incident rays that contribute only to the blur, and not the central focus spot. FIG. 4 shows the transmission of the angle-dependent filter as a function of angle of incidence.

The invention further demonstrates that even if 100% transmission is assumed at the glass-air boundary for all angles of incidence, the practical impact of the apparently severe defocussing effect of the peripheral rays is very much less than had been previously thought and that, accordingly, the lens-sphere optics appear to be suitable for a spatial MWS.

Table 2 shows the blur circle size as a function of how much of the incident beam is accepted for the case when the focal plane is set to optimally focus the central rays ($\theta = 0-50$ degrees). The percentage of the available input energy over the full aperture, assuming 100% transmission, is also shown. For example, Table 2 shows that about 58.6% of the input energy is focused within a 2.87 degree radius blur circle, and that the balance (about 41.4%) is spread from a 2.876 degree blur radius to 28.9 degree blur radius. At first sight, it appears that because so large a fraction (41.4%) of the incident radiation is so badly defocussed, the resolution performance is unacceptable.

However, in the MWS application, there is no general background clutter. The targets are, essentially, point-targets and the only factor limiting detection is shot-noise-in-signal. The invention recognizes for the first time that under these conditions, it is not the total energy in the blur circle that is the relevant limitation, but rather the energy density in the blur image as shown in Table 3. Because the blur circle is so large (e.g., 28.9 degree radius), the density (as measured in photons/second/resolution element) is correspondingly very low.

The ability to discriminate two closely spaced targets, with no background signal, depends upon the magnitude of d as shown in FIG. 5(a). FIG. 5(b) illustrates that d depends, in turn, only upon a,b - the point source intensity response function at peak, and one pixel away. All of the energy in the rest of the blur pattern has no effect. It is only when a general background (e.g., cloud clutter) is present that the total energy of the blur is significant.

The low energy density in the out-focus part of the point source intensity response function for the lens-sphere optical system is quantified in Table 3. It presents the same results as Table 2 except that instead of percent energy, the energy density (ED) is given with, and without, the use of the angle-dependent interference filter. For computational simplicity, the energy density for the central rays (up to a 2.82 degree blur circle) is computed as an average over that area. The energy density in the periphery of the blur is calculated for each step. It can be seen that because the area of the peripheral blur is so large, the corresponding energy density is low. Then, as illustrated in FIG. 5, it has very little impact upon the detection and location of point targets against a zero background. The resolution performance of the sensor system depends therefore mainly upon the size of the central spot, and not on the defocus blur caused by the rays coming from the edge of the entrance aperture. Table 3 also illustrates how the intensity of the peripheral (i.e. out-of-focus) component is reduced by the use of the interference filter. This feature is particularly important for discriminating the true target in the presence of a much more intense disturbing source, such as a counter-measure flare.

For example, Table 3 indicates that a source 12.5° away from the target would contribute a signal at the target of 0.01 relative units as compared to 287 relative units from the target. Thus, the disturbing source could be as much as 28,700 times the target intensity before its contribution at the target position equaled that of the target.

TABLE 1

TRANSMISSION INTO SPHERE AS A FUNCTION OF ANGLE OF INCIDENCE Index = 1.7

| INCIDENCE | ANGLE OF REFRACTION | TRANSMISSION FACTOR |
|---|---|---|
| 50 | 26.78311 | .9129376 |
| 52 | 27.6155 | .9084619 |
| 54 | 28.41747 | .9030868 |
| 56 | 29.1875 | .8966404 |
| 58 | 29.92407 | .8889159 |
| 60 | 30.62565 | .8796649 |
| 62 | 31.29073 | .8685876 |
| 64 | 31.91782 | .8553212 |
| 66 | 32.50544 | .839424 |
| 68 | 33.05216 | .8203564 |
| 70 | 33.5566 | .7974554 |
| 72 | 34.01742 | .7699006 |
| 74 | 34.4334 | .7366708 |
| 76 | 34.8034 | .6964832 |
| 78 | 35.12631 | .647714 |
| 80 | 35.40123 | .588285 |
| 82 | 35.62732 | .5155074 |
| 84 | 35.8039 | .4258591 |
| 86 | 35.93042 | .3146587 |
| 88 | 36.00649 | .1755941 |
| 90 | 36.03187 | −7.152558E-07 |

TABLE 2

TOTAL ENERGY
INPUT HALF ANGLE: 50 DEGS;
F LENGTH: 1.2157          BLUR HALF ANGLE: 1.46805 DEGS;

| BLUR AT HALF-THETA = 5 | IS | .35565% | ENERGY = | .759613% |
|---|---|---|---|---|
| BLUR AT HALF-THETA = 10 | IS | .682195% | ENERGY = | 3.01537% |
| BLUR AT HALF-THETA = 15 | IS | .950347% | ENERGY = | 6.69873% |
| BLUR AT HALF-THETA = 20 | IS | 1.13033% | ENERGY = | 11.6978% |
| BLUR AT HALF-THETA = 25 | IS | 1.19164% | ENERGY = | 17.8606% |
| BLUR AT HALF-THETA = 30 | IS | 1.10255% | ENERGY = | 25.% |
| BLUR AT HALF-THETA = 35 | IS | .829657% | ENERGY = | 32.899% |
| BLUR AT HALF-THETA = 40 | IS | .337122% | ENERGY = | 41.3176% |
| BLUR AT HALF-THETA = 45 | IS | .414229% | ENERGY = | 50.% |
| BLUR AT HALF-THETA = 50 | IS | 1.46805% | ENERGY = | 58.6824% |
| BLUR AT HALF-THETA = 55 | IS | 2.87389% | ENERGY = | 67.101% |
| BLUR AT HALF-THETA = 60 | IS | 4.68899% | ENERGY = | 75.% |
| BLUR AT HALF-THETA = 65 | IS | 6.98036% | ENERGY = | 82.1394% |
| BLUR AT HALF-THETA = 70 | IS | 9.82729% | ENERGY = | 88.3023% |
| BLUR AT HALF-THETA = 75 | IS | 13.324% | ENERGY = | 93.3013% |
| BLUR AT HALF-THETA = 80 | IS | 17.582% | ENERGY = | 96.9846% |
| BLUR AT HALF-THETA = 85 | IS | 22.7296% | ENERGY = | 99.2404% |
| BLUR AT HALF-THETA = 90 | IS | 28.9078% | ENERGY = | 100.% |

TABLE 3

ENERGY DENSITY
INPUT HALF ANGLE: 50 DEGS; BLUR HALF ANGLE: 1.468028 DEGS; F LENGTH: 1.215706
ACTUAL HALF BLUR = 1.460521

| THETA/2 | BLUR | ED | ED WITHOUT INT. FILTER |
|---|---|---|---|
| 5 | −.3556964 | 287.509 | 287.509 |
| 10 | −.6825468 | 287.509 | 287.509 |
| 15 | −.9513471 | 287.509 | 287.509 |
| 20 | −1.132212 | 287.509 | 287.509 |
| 25 | −1.19423 | 287.509 | 287.509 |
| 30 | −1.1052 | 287.509 | 287.509 |
| 35 | −.8314132 | 287.509 | 287.509 |
| 40 | −.3374677 | 287.509 | 287.509 |
| 45 | .413667 | 287.509 | 140.00 |
| 50 | 1.460521 | 287.509 | 70.00 |
| 55 | 2.842762 | 14.79476 | 7.00 |
| 60 | 4.600493 | 6.313195 | 1.22 |
| 65 | 6.773284 | 3.023969 | 0.24 |
| 70 | 9.398888 | 1.521802 | 0.03 |
| 75 | 12.51169 | .770692 | 0.01 |
| 80 | 16.14093 | .3740807 | 0.008 |
| 85 | 20.30903 | .1578329 | 0.001 |
| 90 | 25.03012 | 3.807866E-02 | 0.00 |

As in any lens, the set of parallel rays from an object at infinity are not all brought to a common focus point. Some of the incident rays will be brought to a relatively sharp focus at the detector while other rays will be spread out over a large blur circle as shown on FIG. 2.

In a conventional lens, the rays outside the selected bundle of rays, for example, from $\theta = 60$ degrees to $\theta = 90$ degrees can be removed by appropriately stopping down the lens. This cannot be done in the case of a lens-sphere because the corresponding parts of the lens are needed to collect rays from the other direction. However, the position of the detector (i.e., the focal point) can be chosen so that as many as possible of the incident rays fall within the desired resolution blur circle, which as discussed below may advantageously be about a 5 degree diameter. In accordance with the invention, about 60 percent of the total flux incident at the physical aperture of the system as defined by the actual outside diameter of the assembly is focused within the desired 5 degree blur circle. The target signal may be contaminated by generally low spatial frequency background clutter in some applications and by a strong adjacent point source, such as a flare, in other applications. The resulting detected image can be spatially filtered by well known digital processing techniques, for example in the digital domain after detection and digitization, to attenuate unwanted clutter-induced low spatial frequencies contributed by the extreme rays that cannot be focused to within the desired blur circle resolution. The disturbing effect of an adjacent strong point source is attenuated by the referenced interference filter which effectively limits the entrance aperture thereby reducing the percentage of energy in the out-of-focus blur spot.

SUMMARY OF THE INVENTION

In accordance with the invention, a lens-sphere optical system for use in a low resolution, very wide angle optical sensor system for viewing incident energy from a scene of interest is disclosed for the first time. The lens-sphere optical system of the invention includes a lens-sphere which forms an output image of the scene of interest on a focal plane which is a concentric spherical surface at the rear of the lens. Incident energy outside of a predetermined range of incident angles is blocked from entering the lens-sphere by an angle-dependent interference filter applied to the surface of the lens. Finally, means for detecting and digitizing the image formed by the lens and means for providing high-pass spatial filtering of the digitized image is also included.

OBJECTS AND ADVANTAGES OF THE INVENTION

It is one object of the invention to provide a lens-sphere optical sensing system for use in a Missile Warning System.

It is yet another object of the invention to provide a lens-sphere optical sensing system for use in a low resolution, very wide angle optical system.

It is yet another further object of the invention to provide a lens-sphere optical system with a blur circle in the range of about 3 degrees to about 5 degrees having an angle-dependent interference filter adapted to the lens-sphere so as to block transmission of incident energy outside of a predetermined range of incident angles.

Other features, objects and advantages of the invention will become apparent from the following description, claims and drawings in which like numerals refer to identical elements.

DETAILED DESCRIPTION OF THE PREFERRED EMBODIMENTS

Figure 6:
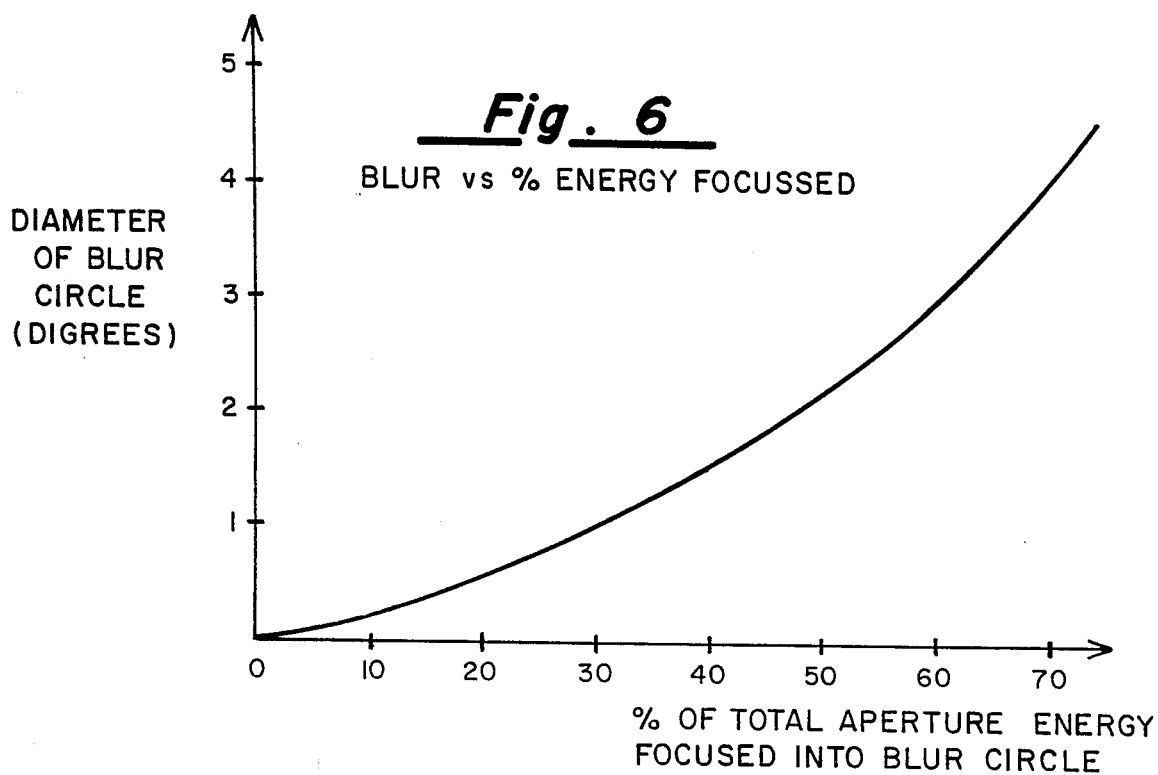
FIG. 6 shows graphically the relationship between the diameter of the blur circle and percentage of energy focused into the blur circle.
Figure 7:
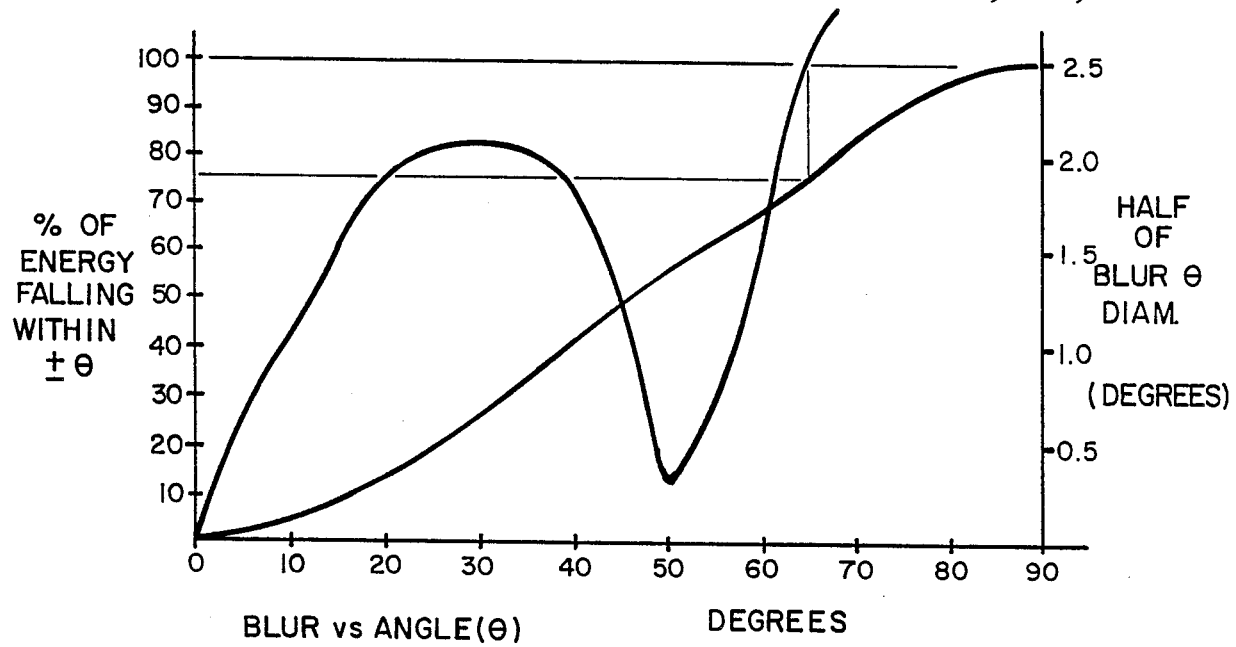
FIG. 7 shows graphically the relationships of blur versus angle of incidence and focused energy.

Prior to describing in detail the elements of the preferred embodiment of the invention, it will be helpful for explanatory purposes to go through an analysis of the theory of operation of the lens-sphere optical system as implemented by the invention. With reference to FIG. 2, it can be seen that because of the perfect spherical symmetry of the lens-sphere, it is only necessary to analyze the on-axis case shown. Exactly the same result will apply to all of the incident directions, A, B and C, shown in FIG. 1. Table 1 shows a calculation of the position and direction of the refractive rays corresponding to the incident bundle of parallel rays shown in FIG. 2. The various incident parallel rays are characterized by the angle of incidence ($\theta$) at the spherical surface 15. As shown in FIG. 2, $\theta$ varies from zero degrees at the center of the lens to 90 degrees at the edge of the lens. For a certain predetermined range of $\theta$, for example, from 0 to 60 degrees, the position of the focal plane which minimizes the blur circle for these particular rays can be found. For this particular focal point position, the blur diameter for each of the input rays for all values of $\theta$ from 0 to 90 degrees can then be calculated. This results in the optimum resolution performance achieved for the selected range of rays (e.g., $\theta = 0$ to 60 degrees) together with resolution for rays outside that range. These calculations may be done from ranges of 0–25, 0–30, 0–35, etc., to 0–90 degrees. See Table 2 for an example showing results of such calculations for the range of 0–50 degrees. Assuming 100% transmission at the air-sphere interface, for any value of $\theta$, the fraction of the total available input energy that falls within $-\theta$ to $+\theta$ is $\sin^2 \theta$. This fraction is computed and shown in Table 2 as percent energy. From the values for in Table 2, a graph can be drawn as shown in FIG. 6 showing the percentage of energy that can be focused within a given blur circle diameter versus the diameter of that blur circle. FIG. 6 shows graphically, for example, that 75% of the energy incident at the total physical system aperture can be focused within less than 5 degree diameter blur circle. FIG. 7 plots the blur circle diameter as a function of $\theta$ for the particular focal distance that yields 75 percent energy in a 5 degree blur circle. A blur circle of this magnitude provides low resolution imaging in comparison to other typical non-spherical lens systems.

Figure 8:
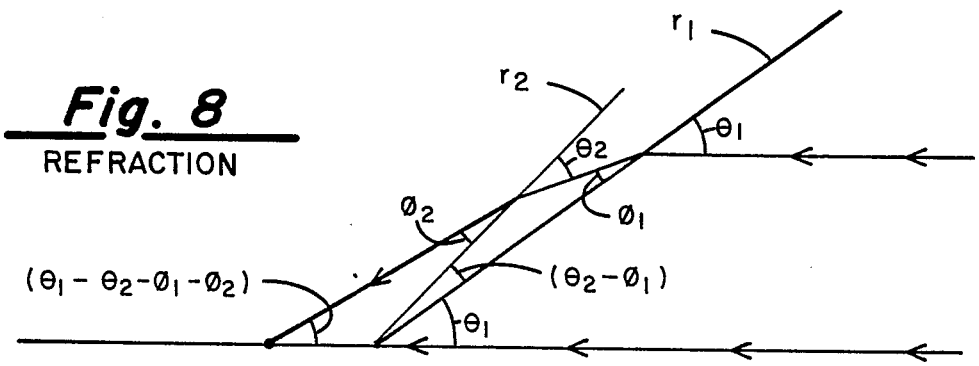
FIG. 8 shows a graphical analysis of the method by which refraction by the lens-sphere of the invention was calculated.
Figure 9:
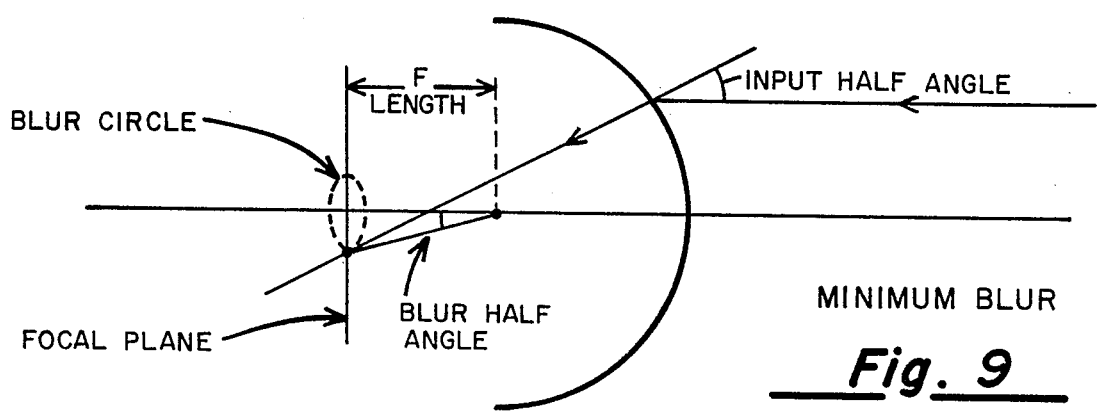
FIG. 9 is a ray trace diagram showing the derivation of the blur half-angle.

FIG. 8 shows how the refraction by the sphere was calculated. For generality, the case of two concentric refracting surfaces are shown. Because of spherical symmetry, it is necessary to consider only one input direction for the rays. Thus, the only input variable is the angle $\theta_1$ between the input ray and the local normal to the first surface. The angle $\phi_1$ of the ray to the normal after refraction is given:

$$n_o * \sin(\theta_1) = n_1 * \sin(\phi_2)$$

If one assumes that the refracted ray is then incident at a second surface of radius $r_2$, then, by applying the sine rule to the $r_1$, $r_2$ triangle, the angle $\theta_2$ of that ray to the normal at the second surface is given by:

$$\sin(\theta_2)/r_1 = \sin(\phi_1)/r_2$$

The refracted ray as shown crossing the horizontal line at a distance f from the center of the lens-sphere lens, and at angle $\theta_T$. From FIG. 2, it can be seen that:

$$\theta_T = \theta_1 + \theta_2 - \phi_1 - \phi_2$$

and that:

$$f/\sin(\theta_2) = r_2/\sin(\theta_T)$$

These refraction equations can be applied in, for example, a computer program to compute the angles of incidence listed in Table 2.

ANGULAR RANGE OF THE LENS-SPHERE

If it is attempted to capture rays over an angular range of +R to −R degrees, then the spherical output focal surface will occupy +R to −R degrees. From FIG. 1 it can be seen that the input rays will fall over an angular range of −(R+90) to +(R+90) degrees. That is, the total input and output angular range is 4R+180. If no rays are to be lost, then $$4R + 180 = 360.$$

That is, R=45 degrees. The embodiment of the invention shown in FIG. 1, corresponds to a value of R=60 degrees in apparent contradiction to the above result. However, in the design shown in FIG. 1, some of the extreme input rays are not collected. That is, the collecting aperture is effectively stopped down for the extreme rays. This is of no concern, since the lost rays cannot be focused within the desired 5 degree blur circle. Using well-known digital filtering techniques, one can design a digital spatial filter that is used to remove the unwanted low spatial frequencies. Such a filter should have a slightly different characteristic at the edge of the field to accommodate the fact that there is less low frequency energy there that should be removed.

Having described in general the theory of operation of the invention, we now turn to a more detailed description of the preferred embodiment.

Figure 1:
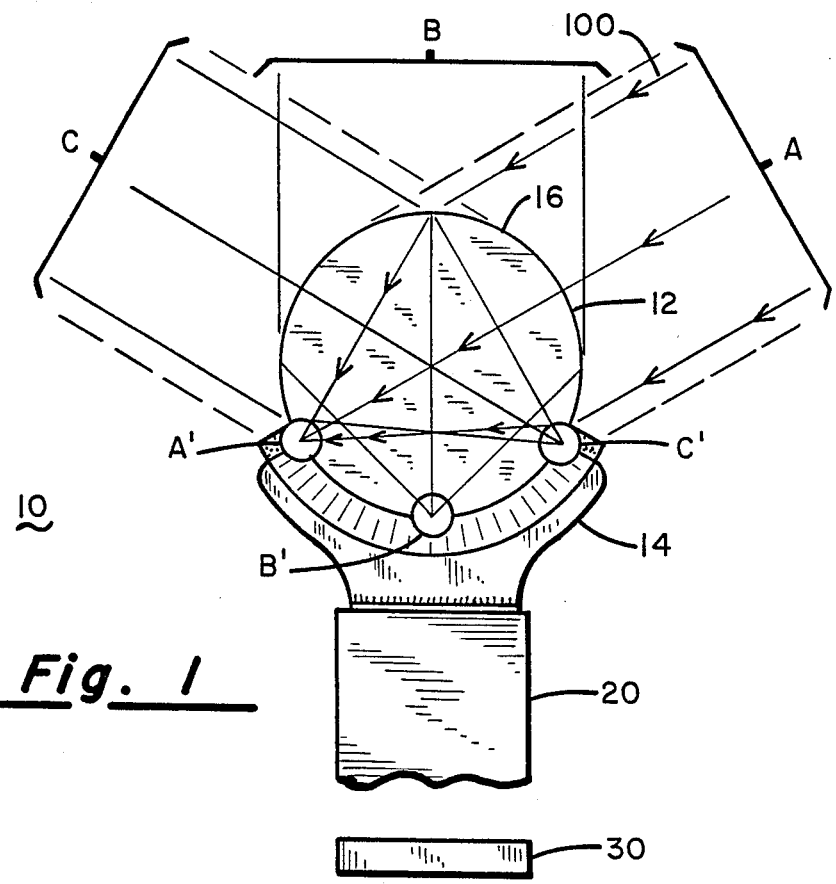
FIG. 1 shows schematically one embodiment of the lens-sphere optical sensing system of the invention.
Figure 2:
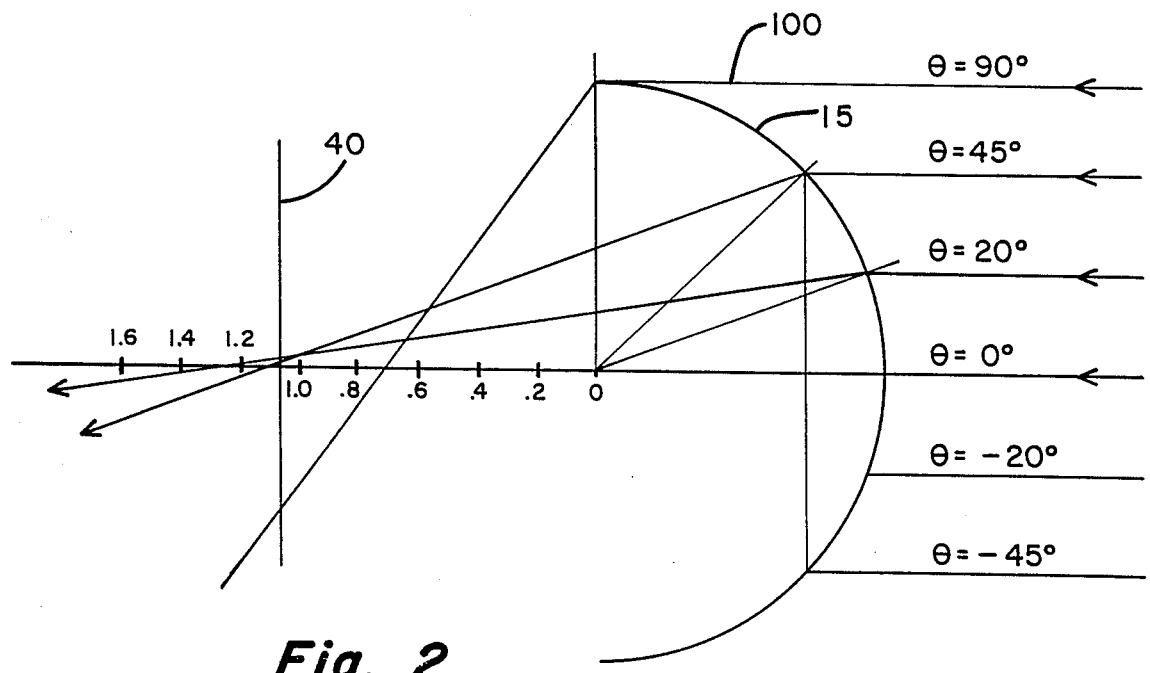
FIG. 2 shows schematically a ray trace analysis of focusing rays with a lens-sphere, such as is implemented by the present invention.
Figure 3:
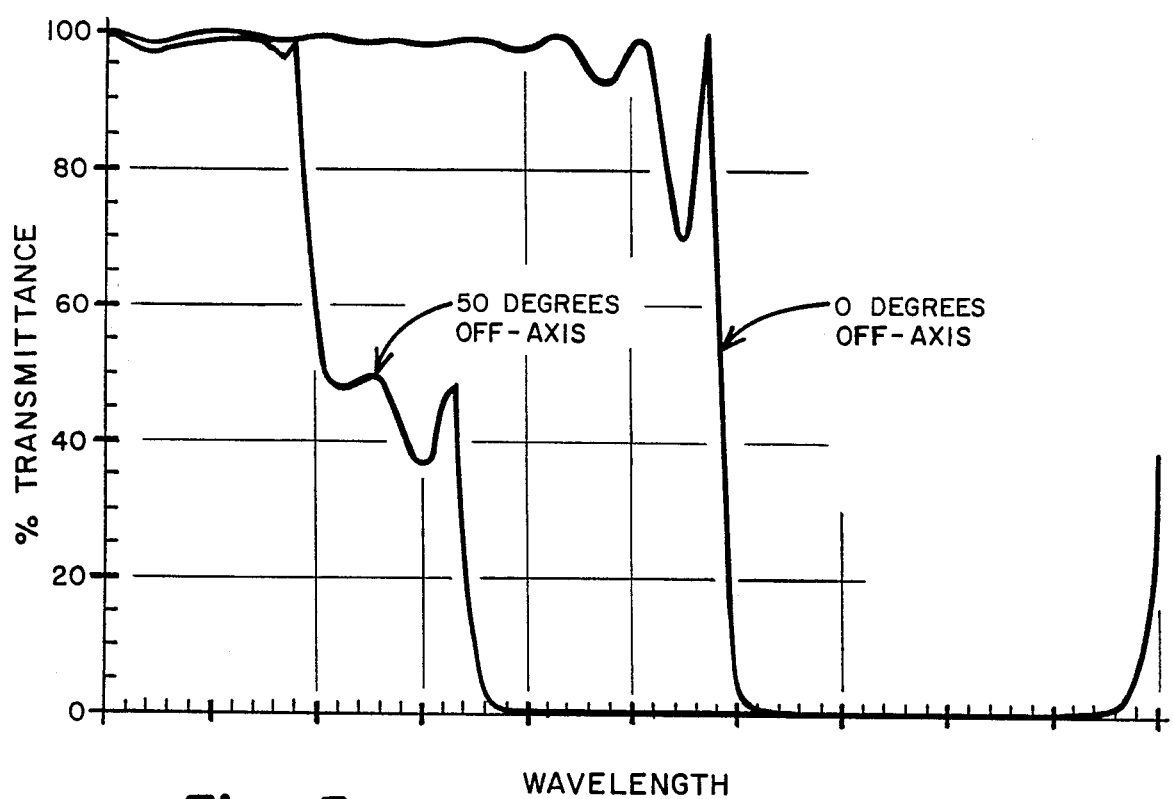
FIG. 3 shows graphically the transmission of a typical angle-dependent interference filter as a function of wavelength for the cases of zero and 50 degrees angle of incidence.
Figure 4:
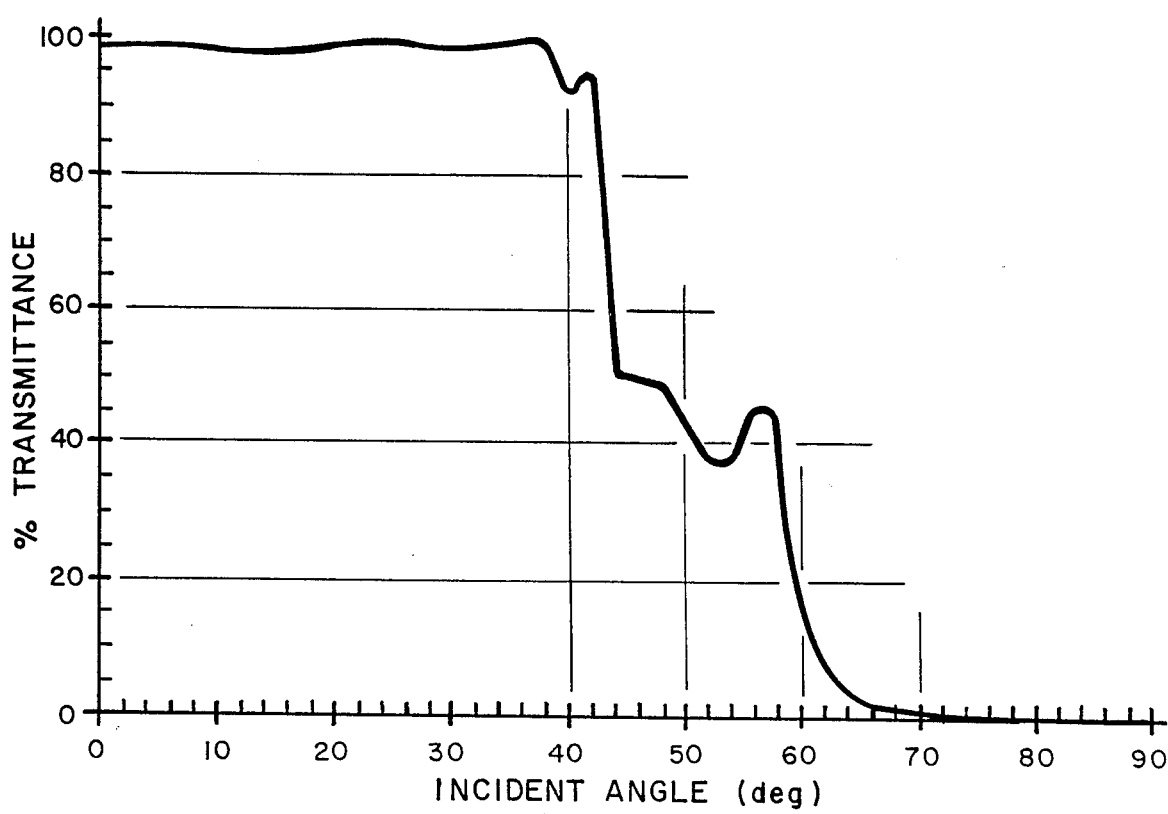
FIG. 4 shows graphically the transmission of an angle-dependent interference filter around the design wavelength as a function of angle of incidence.

Referring now to FIG. 1, one embodiment of the invention is shown there schematically. The invention comprises a lens-sphere 12, a first means for optically filtering the lens-sphere 16, and a means for detecting the optically filtered output image of the lens-sphere further including a concave to flat coherent fiber optic converter 14, a second means for optical filtering 20 and infrared detectors 30. The lens-sphere may advantageously be comprised of material having an index of refraction of about 1.7. The first optical filtering means may advantageously comprise an optical coating suitable for blocking incident energy in a range outside of a predetermined range of incident angles, for example, outside of the range of incident angles of +60 degrees to −60 degrees. The second optical filtering means may advantageously be a bandpass optical filter designed to pass only radiation over a specified range of wavelengths. The detectors 30 may suitably be a scanning photomultiplier (PM) tube or equivalent device or, depending, upon the wavelength of interest in a particular application, an array of infrared detectors comprised of, for example, a mercury-cadmium-telluride material.

Still with reference to FIG. 1, if one considers the case where incident rays are accepted from direction B, the rays will be focused in about a 5 degree blur circle at point B'. Similarly, rays from direction A will be focused at A' and rays from direction C at C'. For an input of incident energy in the range of angles from −60 degrees to +60 degrees azimuth and elevation, more than 75 percent of the input energy from the B direction will be in blur circle B'.

In one embodiment of the invention, the rays propagate through the optical coating 16, are focused at blur circle B' and are transmitted through the fiber optic converter 14, the optical filters 20, to the detectors 30 which output an electrical signal to the system electronics (not shown).

Figure 5A:
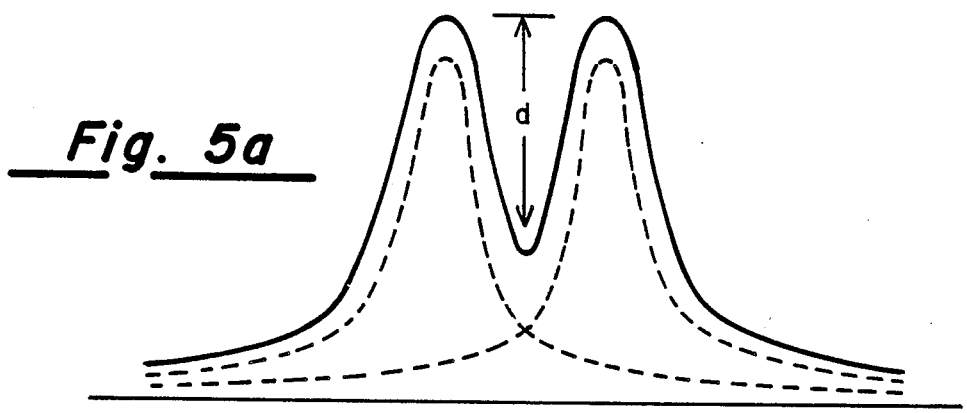
FIG. 5(a) shows a focal plane intensity pattern with two closely spaced targets wherein the ability to discriminate two targets depends upon the magnitude of d.
Figure 5B:
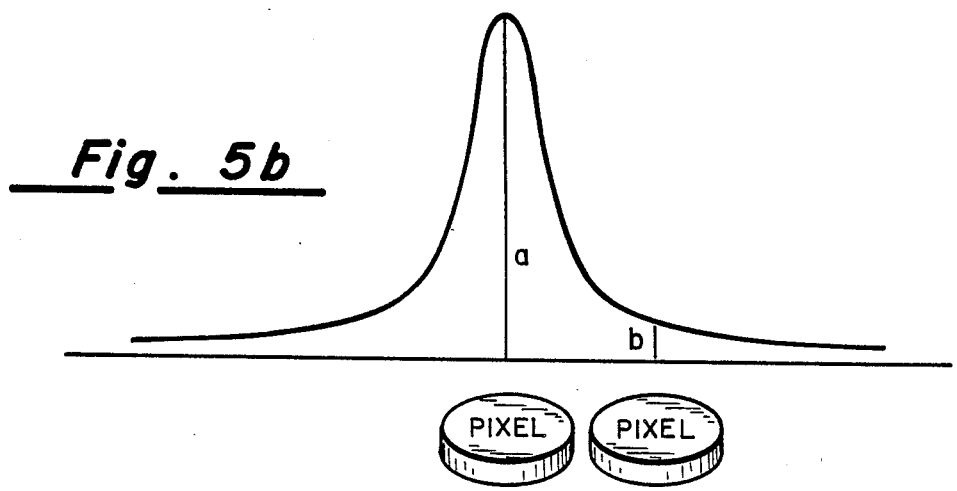
FIG. 5(b) shows graphically the ability to locate a single target, or discriminate between two targets, depends upon the relative magnitude of a, b.

One can then use the unfiltered input energy focused at the blur circle for coarse target detection as previously shown with respect to FIG. 5. Upon applying a spatial filter to the input energy received by the detectors by using well known image processing techniques, the system can locate the source of input energy to within about 5 degrees with loss of only 25 percent of the input energy.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures can be accomplished without departing from the scope of the invention itself.

What is claimed is:

1. A lens-sphere optical system for use in a low resolution, very wide angle optical sensor system for viewing incident energy from a scene of interest comprising:
   (a) a lens-sphere which forms an output image of the scene of interest on a spherical surface;
   (b) a first means for incorporating an angle-dependent optical filter with the lens-sphere so as to block incident energy outside of a predetermined range of incident angles; and
   (c) means for detecting the optically filtered output image.

2. The optical system of claim 1 wherein the filtering means comprises an optical coating.

3. The system of claim 1 wherein the lens-sphere operates so as to capture about 75 percent of the incident energy and focuses the captured incident energy within a blur circle of about 5 degrees.

4. The system of claim 3 wherein the means for detecting comprises:
   (a) at least one imaging sensor; and
   (b) means for transmitting the scene image.

5. The system of claim 4 wherein the at least one image sensor comprises a plurality of infrared detectors comprised of mercury-cadmium-telluride material.

6. The system of claim 5 wherein the transmitting means comprises a concave-to-flat coherent fiber optic converter.

7. The system of claim 4 wherein the at least one imaging sensor comprises a scanning photomultiplier.

8. The system of claim 7 wherein the transmitting means comprises a concave-to-flat coherent fiber optic converter.

9. A lens-sphere optical system for use in a low resolution, very wide angle optical sensor system for viewing incident energy from a scene of interest comprising:
(a) a lens-sphere having a forward portion and rearward portion which forms an output image of the scene of interest at the rear of the lens-sphere;
(b) a first means for incorporating an angle-dependent optical filter with the lens-sphere so as to block incident energy outside of a predetermined range of incident angles;
(c) a concave-to-flat coherent fiber optic converter having a receiving and a transmitting end adjoined at the receiving end to the rearward portion of the lens-sphere; and
(d) a second means for optically filtering the output image disposed so as to receive the energy transmitted by the concave-to-flat fiber optic converter within a predetermined band of optical wavelengths; and
(e) an imaging detector or an array of detectors disposed to receive the filtered energy.

10. The system of claims 1 or 9 wherein the lens-sphere is comprised of an optical material having an index of refraction of about 1.7.

11. The system of claim 9 wherein the first optical filtering means comprises an optical coating applied to the lens-sphere.

12. The system of claim 9 wherein the second optical filtering means is a bandpass filter.

13. A lens-sphere optical system for use in a low resolution, very wide angle infrared sensor system for viewing incident energy from a scene of interest comprising:
(a) a lens-sphere which forms an output image of the scene of interest on a spherical surface;
(b) a first means for incorporating an angle-dependent optical filter with the lens-sphere so as to block incident energy outside of a predetermined range of incident angles; and
(c) infrared detecting means for detecting the optically filtered output image.

14. The optical system of claim 13 wherein the filtering means comprises an optical coating.

15. The system of claim 13 wherein the lens-sphere operates so as to capture about 75 percent of the incident energy and focuses the captured incident energy within a blur circle of about 5 degrees.

16. The system of claim 15 wherein the means for detecting comprises:
(a) an array of infrared detectors; and
(b) means for transmitting the scene image.

17. The system of claim 16 wherein the infrared detectors are comprised of mercury-cadmium-telluride material.

18. The system of claim 17 wherein the transmitting means comprises a concave-to-flat coherent fiber optic converter.

19. The system of claim 15 wherein the means for detecting comprises a scanning photomultiplier.

20. The system of claim 19 wherein the transmitting means comprises a concave-to-flat coherent fiber optic converter.

21. A lens-sphere optical system for use in a low resolution, very wide angle infrared sensor system for viewing incident energy from a scene of interest comprising:
(a) a lens-sphere having a forward portion and rearward portion which forms an output image of the scene of interest at the rear of the lens-sphere;
(b) a first means for incorporating an angle-dependent optical filter with the lens-sphere so as to block incident energy outside of a predetermined range of incident angles;
(c) a concave-to-flat coherent fiber optic converter having a receiving and a transmitting end adjoined at the receiving end to the rearward portion of the lens-sphere; and
(d) a second means for optically filtering the output image disposed so as to receive the energy transmitted by the concave-to-flat fiber optic converter within a predetermined band of optical wavelengths; and
(e) an infrared imaging detector or an array of infrared detectors disposed to receive the filtered energy.

22. The system of claims 13 or 21 wherein the lens-sphere is comprised of an optical material having an index of refraction of about 1.7.

23. The system of claim 21 wherein the first optical filtering means comprises an optical coating applied to the lens-sphere.

24. The system of claim 21 wherein the second optical filtering means is a bandpass filter.

* * * * *